US009021035B2

(12) United States Patent
Auriemma et al.

(10) Patent No.: US 9,021,035 B2
(45) Date of Patent: Apr. 28, 2015

(54) FORMATTING RICH TEXT DATA INTO A JSON ARRAY

(75) Inventors: Stephen T. Auriemma, Chelmsford, MA (US); David P. Delay, Milford, NH (US); Philippe Riand, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/590,438

(22) Filed: Aug. 21, 2012

(65) Prior Publication Data

US 2014/0059140 A1    Feb. 27, 2014

(51) Int. Cl.
    *G06F 15/16*      (2006.01)
    *G06F 17/30*      (2006.01)

(52) U.S. Cl.
    CPC .................. *G06F 17/30861* (2013.01)

(58) Field of Classification Search
    CPC ........................................................ G06F 15/00
    USPC ................................................. 709/206, 228
    See application file for complete search history.

(56) References Cited

U.S. PATENT DOCUMENTS

| | | | |
|---|---|---|---|
| 6,938,204 B1 * | 8/2005 | Hind et al. | 715/234 |
| 2011/0321010 A1 | 12/2011 | Wang | |
| 2013/0317995 A1 * | 11/2013 | Koenig et al. | 705/311 |

OTHER PUBLICATIONS

Borenstein, N. et al., "MIME (Multipurpose Internet Mail Extensions) Part One: Mechanisms for Specifying and Describing the Format of Internet Message Bodies," [online] Internet Engineering Task Force (IETF) RFC 1521, Sep. 1993, [retrieved Aug. 20, 2012] retrieved from the Internet: <http://www.ietf.org/rfc/rfc1521.txt>, 76 pgs.

Crockford, D. "The application/JSON Media Type for JavaScript Object Notation (JSON)," [online] Internet Engineering Task Force (IETF) RFC 4627, Jul. 2006 [retrieved Aug. 20, 2012] retrieved from the Internet: <http://www.ietf.org/rfc/rfc4627.txt>, 10 pgs.

Crocker, D.H., "Standard for the Format of ARPA Internet Text Messages," [online] Internet Engineering Task Force (IETF) RFC 822, Aug. 13, 1982 [retrieved Aug. 20, 2012] retrieved from the Internet: <http://www.ietf.org/rfc/rfc0822.txt>, 49 pgs.

Freed, N. et al., "Multipurpose Internet Mail Extensions (MIME) Part One: Format of Internet Message Bodies," [online] Internet Engineering Task Force (IETF) RFC 2045, Nov. 1996 [retrieved Aug. 20, 2012] retrieved from the Internet: <http://www.ietf.org/rfc/rfc2045.txt>, 29 pgs.

(Continued)

*Primary Examiner* — Ebrahim Golabbakhsh
(74) *Attorney, Agent, or Firm* — Cuenot, Forsythe & Kim, LLC (57) ABSTRACT

Formatting rich text data into a JSON array. A parent JSON object can be created within the JSON array. Header information defined as a field of the rich text data can be identified and represented in a root property of the parent JSON object. A plurality of parts of the rich text data can be identified. For each of the plurality of parts of the rich text data, content of the part can be identified. A first respective child JSON object can be inserted into the parent JSON object. The content of the part can be represented in a content property of the respective child JSON object. Header information of the part can be identified and represented in a header property of the respective first child JSON object. The JSON array can be output as a JSON file.

20 Claims, 3 Drawing Sheets

(56) References Cited

OTHER PUBLICATIONS

Freed, N. et al., "Multipurpose Internet Mail Extensions (MIME) Part Two: Media Types, " [online] Internet Engineering Task Force (IETF) RFC 2046, Nov. 1996 [retrieved Aug. 20, 2012] retrieved from the Internet: <http://www.ietf.org/rfc/rfc2046.txt>, 42 pgs.

Moore, K., "Multipurpose Internet Mail Extensions (MIME) Part Three: Message Header Extensions for Non-ASCII Text," [online] Internet Engineering Task Force (IETF) RFC 2047, Nov. 1996 [retrieved Aug. 20, 2012] retrieved from the Internet: <http://www.ietf.org/rfc/rfc2047.txt>, 15 pgs.

Freed, N. et al., "Multipurpose Internet Mail Extensions (MIME) Part Four: Registration Procedures," [online] Internet Engineering Task Force (IETF) RFC 2048, Nov. 1996 [retrieved Aug. 20, 2012] retrieved from the Internet: <http://www.ietf.org/rfc/rfc2048.txt>, 20 pgs.

Freed, N. et al., "Multipurpose Internet Mail Extensions (MIME) Part Five: Conformance Criteria and Examples," [online] Internet Engineering Task Force (IETF) RFC 2049, Nov. 1996 [retrieved Aug. 20, 2012] retrieved from the Internet: <http://www.ietf.org/rfc/rfc2049.txt>, 23 pgs.

Borenstein, N., "A User Agent Configuration Mechanism for Multimedia Mail Format Information," [online] Internet Engineering Task Force (IETF) RFC 1524, Sep. 1993 [retrieved Aug. 20, 2012] retrieved from the Internet: <http://www.ietf.org/rfc/rfc1527.txt>, 13 pgs.

Elkins, M., "MIME Security With Pretty Good Privacy (PGP)," [online] Internet Engineering Task Force (IETF) RFC 2015, Oct. 1996 [retrieved Aug. 20, 2012] retrieved from the Internet: <http://www.ietf.org/rfc/rfc2015.txt>, 8 pgs.

Palme, J. et al., "MIME E-mail Encapsulation of Aggregate Documents, Such as HTMl (MHTML)," [online] Internet Engineering Task Force (IETF) RFC 2110, Mar. 1997 [retrieved Aug. 20, 2012] retrieved from the Internet: <http://www.ietf.org/rfc/rfc2110.txt>, 18 pgs.

Levinson, E., "Content-ID and Message-ID Uniform Resource Locators," [online] Internet Engineering Task Force (IETF) RFC 2111, Mar. 1997 [retrieved Aug. 20, 2012] retrieved from the Internet: <http://www.ietf.org/rfc/rfc2111.txt>, 5 pgs.

Levinson, E., "The MIME Multipart/Related Content-Type," [online] Internet Engineering Task Force (IETF) RFC 2112, Mar. 1997 [retrieved Aug. 20, 2012] retrieved from the Internet: <http://www.ietf.org/rfc/rfc2112.txt>, 10 pgs.

Troost, R. et al., "Communicating Presentation Information in Internet Messages: The Content-Disposition Header Field," [online] Internet Engineering Task Force (IETF) RFC 2183, Aug. 1997 [retrieved Aug. 20, 2012] retrieved from the Internet: <http://www.ietf.org/rfc/rfc2183.txt>, 12 pgs.

Freed, N. et al., "MIME Parameter Value and Encoded Word Extensions: Character Sets, Languages, and Continuations," [online] Internet Engineering Task Force (IETF) RFC 2231, Nov. 1997 [retrieved Aug. 20, 2012] retrieved from the Internet: <http://www.ietf.org/rfc/rfc2231.txt>, 10 pgs.

Callas, J. et al, "OpenPGP Message Format," [online] Internet Engineering Task Force (IETF) RFC 2440, Nov. 1998, [retrieved Aug. 20, 2012] retrieved from the Internet: <http://www.ietf.org/rfc/rfc2440.txt>, 61 pgs.

Ramsdell, B., "S/MIME Version 3 Message Specification," [online] Internet Engineering Task Force (IETF) RFC 2633, Jun. 1999 [retrieved Aug. 20, 2012] retrieved from the Internet: <http://www.ietf.org/rfc/rfc2633.txt>, 30 pgs.

Klensin, J., "Simple Mail Transfer Protocol," [online] Internet Engineering Task Force (IETF) RFC 2821, Apr. 2001 [retrieved Aug. 20, 2012] retrieved from the Internet: <http://www.ietf.org/rfc/rfc2821.txt>, 74 pgs.

Resnick, P., "Internet Message Format," [online] Internet Engineering Task Force (IETF) RFC 2822, Apr. 2001 [retrieved Aug. 20, 2012] retrieved from the Internet: <http://www.ietf.org/rfc/rfc2822.txt>, 48 pgs.

Elkins, M. et al., "MIME Security With OpenPGP," [online] Internet Engineering Task Force (IETF) RFC 3156, Aug. 2001 [retrieved Aug. 20, 2012] retrieved from the Internet: <http://www.ietf.org/rfc/rfc3156.txt>, 15 pgs.

* cited by examiner

FORMATTING RICH TEXT DATA INTO A JSON ARRAY

BACKGROUND

Embodiments described herein relate to the use of JavaScript Object Notation (JSON) to communicate data, such as documents, messages, or the like.

JSON is a text-based open standard designed for human-readable data interchange. It is derived from the JavaScript® scripting language for representing simple data structures and associative arrays, called objects. Despite its relationship to JavaScript®, it is language-independent, with parsers available for many languages. The JSON format often is used for serializing and transmitting structured data over a communication network. It is used primarily to transmit data between a server and web application, serving as an alternative to extensible markup language (XML).

Multipurpose Internet Mail Extensions (MIME) is an Internet standard defined by the RFC 1521 specification, which is one of many RFC documents which describe various actual and suggested practices relevant to the Internet MIME is designed to be compatible with RFC 822 and other older Internet mail standards, and extends the format of email to support text in character sets other than ASCII, non-text attachments, message bodies with multiple parts and header information in non-ASCII character sets. Virtually all internet email is transmitted in MIME format. MIME's use extends beyond email, however, and often is used to describe content type in general, including content to be communicated via Internet and content to be stored as rich text.

BRIEF SUMMARY

One or more embodiments disclosed within this specification relate to the use of JavaScript Object Notation (JSON) to communicate data, such as documents, messages, or the like.

An embodiment can include a method of formatting rich text data into a JSON array. The method can include creating a parent JSON object within the JSON array and identifying header information defined as a field of the rich text data and representing the header information in a root property of the parent JSON object. The method further can include identifying a plurality of parts of the rich text data and, for each of the plurality of parts of the rich text data, identifying content of the part, inserting into the parent JSON object a first respective child JSON object, and representing the content of the part in a content property of the respective child JSON object. The method further can include identifying header information of the part and representing the header information in a header property of the respective first child JSON object. The children JSON objects are organized into a JSON array within the parent JSON object. The JSON array can be output in a JSON file.

Another embodiment can include a system having a processor. The processor can be configured to initiate executable operations including creating a parent JSON object within the JSON array and identifying header information defined as a field of the rich text data and representing the header information in a root property of the parent JSON object. The executable operations further can include identifying a plurality of parts of the rich text data and, for each of the plurality of parts of the rich text data, identifying content of the part, inserting into the parent JSON object a first respective child JSON object, and representing the content of the part in a content property of the respective child JSON object. The executable operations further can include identifying header information of the part and representing the header information in a header property of the respective first child JSON object. The children JSON objects are organized into a JSON array within the parent JSON object. The JSON array can be output in a JSON file.

Another embodiment can include a computer program product for formatting rich text data into a JSON array. The computer program product can include a computer-readable storage medium having stored thereon program code that, when executed, configures a processor to perform operations including creating a parent JSON object within the JSON array and identifying header information defined as a field of the rich text data and representing the header information in a root property of the parent JSON object. The operations further can include identifying a plurality of parts of the rich text data and, for each of the plurality of parts of the rich text data, identifying content of the part, inserting into the parent JSON object a first respective child JSON object, and representing the content of the part in a content property of the respective child JSON object. The operations further can include identifying header information of the part and representing the header information in a header property of the respective first child JSON object. The children JSON objects are organized into a JSON array within the parent JSON object. The JSON array can be output in a JSON file.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Embodiments described herein relate to the use of JavaScript Object Notation (JSON) to communicate data, such as documents, messages, or the like. Specifically, these embodiments relate to receiving rich text data, and formatting the rich text data into a JSON array, for example within a JSON file (e.g., a JSON message or JSON document). For example, a rich text contained in a Multipurpose Internet Mail Extensions (MIME) file (e.g., a MIME message or MIME document) can be formatted into a JSON array. The JSON file can be communicated to one or more client applications (e.g., web based client applications) for consumption by such client applications.

In comparison to a MIME file, a JSON file is much easier to consume. Specifically, since JSON is derived from the JavaScript® scripting language, web based client applications oftentimes are configured to execute JavaScript. Accordingly, significantly less processing steps are required to process a JSON file in comparison to a MIME file. Moreover, although the data accessed from the source file is flattened into a JSON array, various properties, such as contentType, contentDisposition, boundary, and others, are used assigned to objects in the JSON array to describe the hierarchical structure of the original source file. The actual number of objects inserted into the JSON array is dependent on the rich text data contained in the original source file.

Hereinafter, and within the claims that follow, JavaScript Object Notation will be referred to by the acronym "JSON," and Multipurpose Internet Mail Extensions will be referred to by the acronym "MIME."

Figure 1:
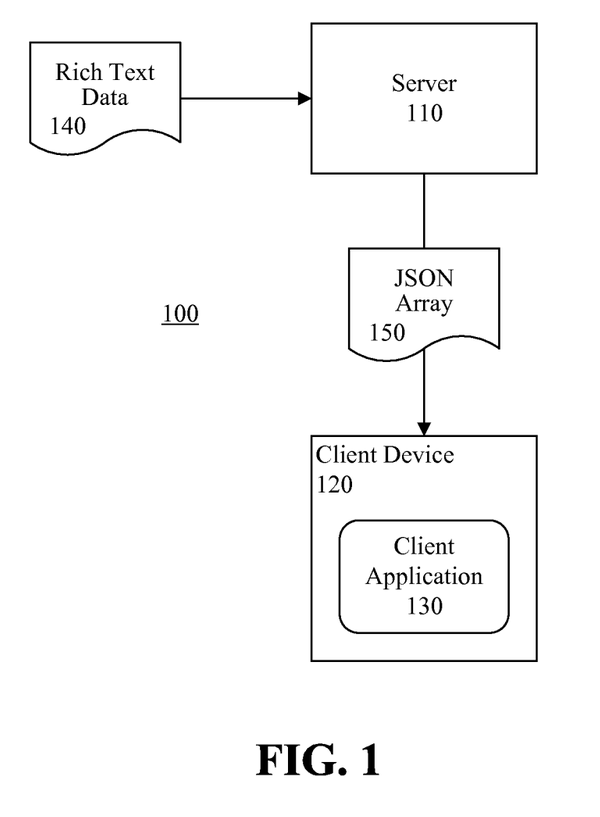
FIG. 1 is a block diagram illustrating a system for formatting rich text data into a JSON array in accordance with one embodiment disclosed within this specification.

FIG. 1 is a block diagram illustrating a system 100 for formatting rich text data into a JSON array in accordance with one embodiment disclosed within this specification. The system 100 can include a server 110. The server 110 can be a computer, or other suitable processing system, executing a suitable program code (e.g., an operating system and one or more applications) and configured to communicate information to one or more client devices via one or more communication networks, such as the Internet, a WAN, a LAN, a wireless LAN, a cellular communication network, and/or any other communication networks suitable for communicating digital information.

The system 100 also can include a client device 120. The client device can be any suitable processing configured to receive and process information received from the server. For example, the client device 120 can be a computer, a workstation, a mobile computer, a laptop computer, a tablet computer, a smart phone, a personal digital assistant, a gaming device, or the like. A client application 130 can execute on the client device 120. The client application 130 can be, for example, a web based client application configured to execute Javascript®, or a client application configured to support any other language supported JSON. The client device 120 can be communicatively linked to the server 110 via one or more suitable communication networks, such as any of those previously described.

In operation, the server 110 can receive rich text data 140. The rich text data 140 can be contained in a file, such as a message or document. In one arrangement, the file can be a MIME file that includes the rich text data 140. The rich text data 140 may include one or more embedded objects, such as images, and/or one or more objects may be attached to the rich text data 140 (e.g., attached to the file).

The server 110 can process the rich text data 140, as will be described herein, to format the rich text data 140 into a JSON array 150, for example within a JSON file, output the JSON array 150. In illustration, the server 110 can store the JSON file containing the JSON array 150, for example to a computer-readable storage device, and/or communicate JSON file containing the JSON array 150 to the client device 120 via the communication network(s). In illustration, the server can communicate the JSON array 150 to the client application 130. The client application 130 can consume the rich text data 140 (now contained in the JSON array 150) in any manner suitable for the client application's intended function.

Figure 2:
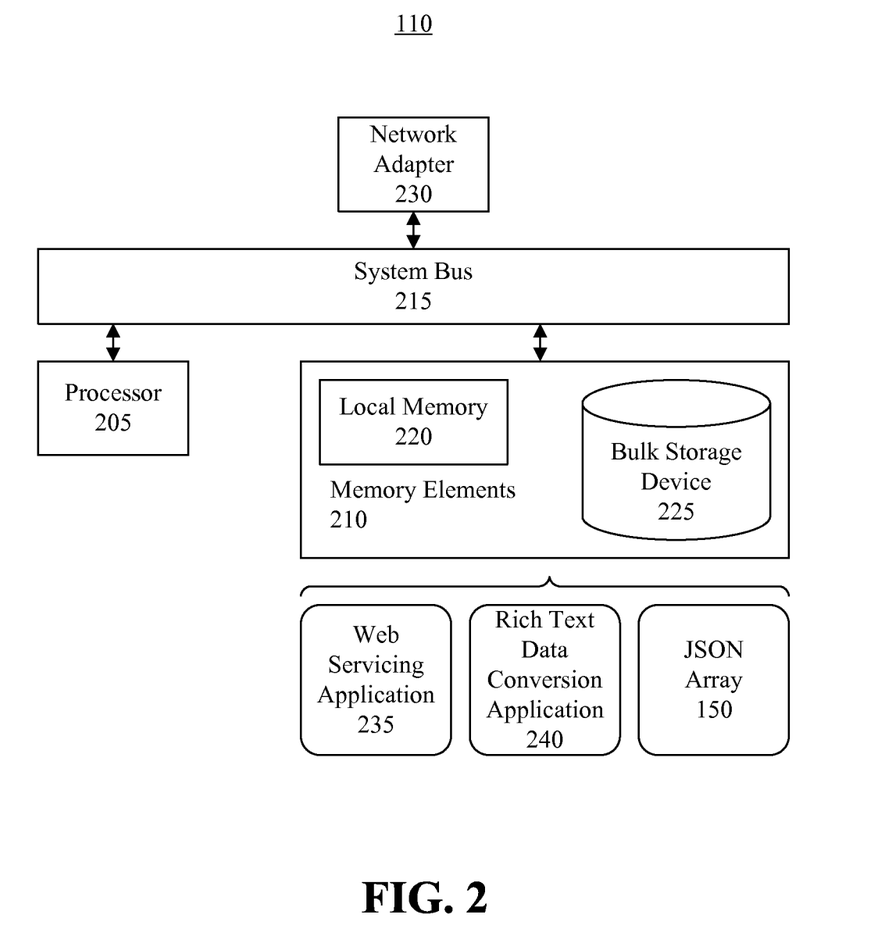
FIG. 2 is a block diagram illustrating a processing system configured to format rich text data into a JSON array in accordance with one embodiment disclosed within this specification.

FIG. 2 is a block diagram illustrating a server 110 configured to format rich text data into a JSON array in accordance with one embodiment disclosed within this specification. The server 110 can include at least one processor 205 coupled to memory elements 210 through a system bus 215 or other suitable circuitry. As such, the server 110 can store program code within the memory elements 210. The processor 205 can execute the program code accessed from the memory elements 210 via system bus 115. In one aspect, for example, the server 110 can be implemented as a computer that is suitable for storing and/or executing program code. It should be appreciated, however, that the server 110 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. The server 110 also can include one or more cache memories (not shown) that provide temporary storage of at least some program code in order to reduce the number of times program code must be retrieved from bulk storage device 225 during execution.

Input/output (I/O) devices can be coupled to the server 110 either directly or through intervening I/O controllers. For example, one or more network adapters 230 can be coupled to the server 110 to enable the server 110 to become coupled to other systems, computer systems, remote printers, and/or remote storage devices through intervening private or public networks. Modems, cable modems, and Ethernet cards are examples of different types of network adapters 230 that can be used with the server 110. Other I/O devices (not shown) such as a keyboard, a display, and a pointing device optionally can be coupled to the server 110.

As pictured in FIG. 2, the memory elements 210 can store a web servicing application 235 and a rich text data conversion application 240. The web servicing application 235 and rich text data conversion application 240, being implemented in the form of executable program code, can be executed by the server 110 and, as such, can be considered part of the server 110.

The web servicing application 235 can be a web hosting application, an e-mail hosting application, or any other application that may be hosted on the server 110 to provide files (e.g., messages or documents) to client devices. The rich text data conversion application 240 can be configured to receive rich text data, for example in MIME format or any other suitable format, and format the rich text data into the JSON array 150. The JSON array 150 can be output to, and stored within, the memory elements 210, or output to a client device. For example, the JSON array 150 can be output in a JSON file. As used herein, "outputting" and/or "output" can mean storing in the memory elements 210, for example, writing to a file stored in the memory elements 210, sending or transmitting to another system, such as the client device, exporting, or the like.

Figure 3:
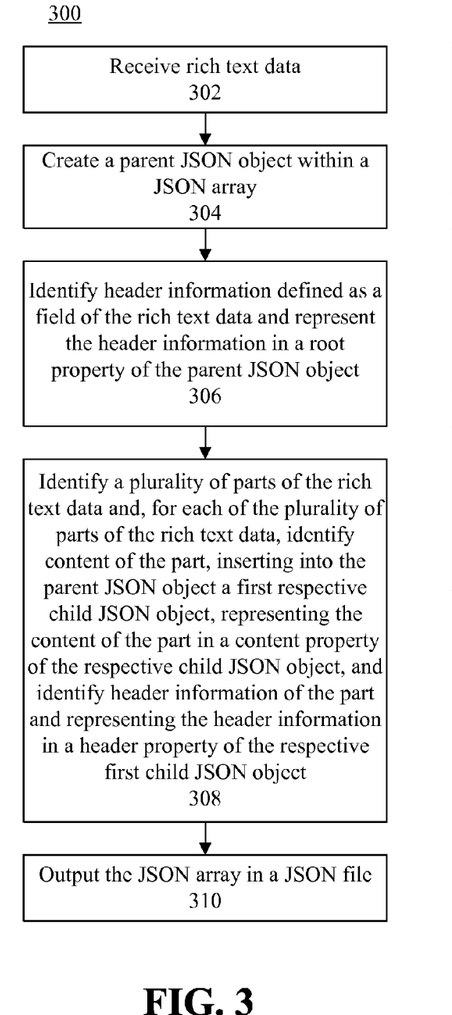
FIG. 3 is a flow chart illustrating a method of formatting rich text data into a JSON array in accordance with another embodiment disclosed within this specification.

FIG. 3 is a flow chart illustrating a method 300 of formatting rich text data into a JSON array in accordance with another embodiment disclosed within this specification. The method 300 can be implemented by the server 110 of FIGS. 1 and 2.

At step 302, the rich text data can be received. In one arrangement, the rich text data can be accessed from a MIME multipart message, though the invention is not limited in this regard. At step 304, a parent JSON object can be created within a JSON array to represent the rich text data in a JSON format. At step 306, header information defined as a field of the rich text data can be identified and the header information can be represented in a root property of the parent JSON object.

At step 308, a plurality of parts of the rich text data can be identified. For each of the plurality of parts of the rich text data, content of the part can be identified. Further, for each of the plurality of parts of the rich text data, a first respective child JSON object can be inserted into the parent JSON object. For each of the plurality of parts of the rich text data, the respective first child JSON object can represent the content of the part in a content property of the respective child JSON object. Further, for each of the plurality of parts of the rich text data, a boundary of the part can be identified and the boundary can be represented in a respective property of the respective first child JSON object. Further, header information of the part can be identified and represented in a header property of the respective first child JSON object. In one arrangement, the header information and the plurality of parts of the rich text data can be identified in a MIME multipart message, though the invention is not limited in this regard.

In an arrangement in which the rich text data contains only multipart/mixed or multipart/related data types, a contentDisposition property having at least one attribute that indicates relationships among respective parts of the rich text data can be assigned to the respective first children objects. In addition, a contentType property having a "multipart/alternative" attribute can be assigned to a respective one of first children JSON objects.

The children JSON objects can be organized into a JSON array within the parent JSON object. At step 310 the JSON array can be output in a JSON file, for example as a message or document.

Figure 4:
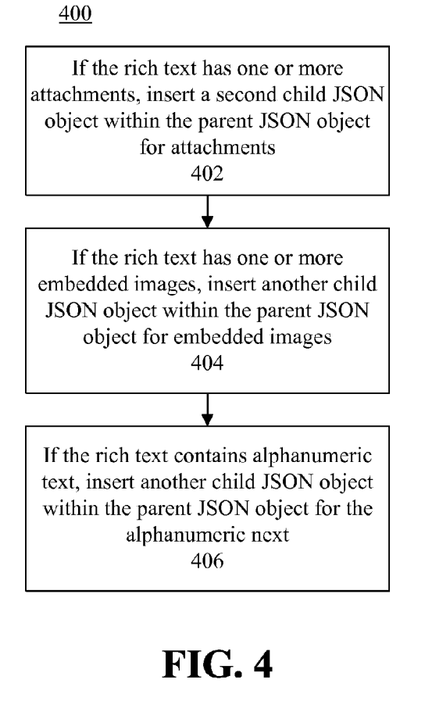
FIG. 4 is a flow chart illustrating a method of formatting rich text data into a JSON array in accordance with another embodiment disclosed within this specification.

FIG. 4 is a flow chart illustrating a method 400 of formatting rich text data into a JSON array in accordance with another embodiment disclosed within this specification. The method 400 describes further processing that may be implemented in step 308 of FIG. 3.

At step 402, if the rich text has one or more attachments, a second child JSON object can be inserted within the parent JSON object to represent the attachments. A contentType property having a "multipart/mixed" attribute can be assigned to the second child JSON object. For the attachment, or each of the attachments if there are more than one, a third child JSON object can be inserted into the second child JSON object. Each third child JSON object can identify the respective attachment. A contentDisposition property having an "attach" attribute can be assigned to each third child JSON object.

At step 404, if the rich text has one or more embedded images, a fourth child JSON object can be inserted within the parent JSON object to represent the embedded images. A contentType property having a "multipart/related" attribute can be assigned to the second child JSON object. For the embedded image, or each of the embedded images if there are more than one, a fifth respective child JSON object can be inserted into the fourth child JSON object. Each fifth child JSON object can identify the respective embedded image. A contentDisposition property having an "inline" attribute can be assigned to each fifth child JSON object.

At step 406, if the rich text contains one or more alphanumeric texts, a sixth child JSON object can be inserted within the parent JSON object to represent the alphanumeric text. A contentType property having a "multipart/alternative" attribute can be assigned to the sixth child JSON object. For the alphanumeric text, or each of the alphanumeric texts if there are more than one, a seventh child JSON object can be inserted into the sixth child JSON object. Each seventh child JSON object can identify the respective alphanumeric text. In one arrangement, the alphanumeric text in the rich text data can be converted to plain text, and a contentType property having a "text/plain" attribute can be assigned to a seventh child JSON object for the plain text. In a further arrangement, the alphanumeric text in the rich text data can be converted to Hypertext Markup Language (HTML)formatted text, and an eighth child JSON object can be inserted into thee sixth child JSON object. A contentType property having A "text/html"attribute can be assigned to the eighth child JSON object.

Referring again to FIG. 1, an example of the rich text data 140 of FIG. 1 is presented in Table 1. In this example, the rich text data is formatted as a MIME file.

TABLE 1

MIME-Version: 1.0
Message-ID:
<OF969862CC.4FF167B1-
ON85257928.0062212C85257928.0062282C@LocalDomain>
Date: Thu, 13 Oct 2011 13:52:07 -0400
From: sender@domain.com
To: recipeint1@domain.com,recipeint2@domain.com
Bcc:
Subject: Test sending mail...
Content-type: multipart/mixed;
    Boundary="0__=mixed"
--0__=mixed
Content-type: multipart/related;
    Boundary="1__=related"
--1__=related
Content-type: multipart/alternative;
    Boundary="2__=alternative"
--2__=alternative
Content-type: text/plain; charset=US-ASCII
Red Text
Blue Text
--2__=alternative
Content-type: text/html; charset=US-ASCII
Content-Disposition: inline
<html><body><font size="2" color="#FF0000" face="sans-serif">Red TABLE 1-continued Text</font><br>
<font size="2" color="#0000FF" face="sans-serif">Blue Text</font><br>
<br>
<img src="cid:2__=0ABBF3A8DFD971158f9e8a93df93869091@local" width="400" height="319"><br>
<br>
</body></html>
--2__=alternative--
--1__=related
Content-Transfer-Encoding: base64
Content-type: image/gif;
    name="Image.gif"
Content-Disposition: inline; filename="Image.gif"
Content-ID: <2__=0ABBF3A8DFD971158f9e8a93df93869091@local>
R01GOD1hkAE/
AeQAAAAAAAgICCAgIBgYGBAQECgoKDAwMDg4OEBA
QEhISFBQUFhYWP///
2BgYGhoaHBwcPDw8Ojo6Hh4eICAgODg4IiIiJCQkJiY
mNjY2KCgoNDQ0MjIyKioqLCwsMDAwLi4uCwAAAAA
--1__=related--
--0__=mixed
Content-Transfer-Encoding: base64
Content-type: image/jpeg;
    name="Picture.JPG"
Content-Disposition: attachment; filename="Picture.JPG"
Content-ID: <1__=0ABBF3A8DFD971158f9e8a93df93869091@local>
/9j/4AAQSkZJRgABAQEAYABgAAD/
2wBDAAgGBgcGBQgHBwcJCQgKDB
QNDAsLDBkSEw8UHRofHh0aHBwgJC4nICIsIxwcKDcp-
LDAxNDQ0Hyc5PT
gyPC4zNDL/2wBDAQkJCQwLDBgNDRgyIRwhMjIyMjIy
--0__=mixed--

Table 2 presents an example of a JSON array 150 generated from the example rich text data 140 presented in Table 1.

TABLE 2

{
    "from":"sender@domain.com",
    "to": [
    "recipeint1@domain.com",
    "recipeint2@domain.com"
],
"cc": [
],
"subject":"Test subject.",
"date":"2011-10-13T17:52:07Z",
"content": [
    {
        "contentType":"multipart\/mixed; Boundary=\"0__=mixed\""
    },
    {
        "contentType":"multipart\/related; Boundary=\"1__=related\"",
        "boundary":"--0__=mixed"
    },
    {
        "contentType":"multipart\/alternative; Boundary=\"2__=alternative\"",
        "boundary":"--1__=related"
    },
    {
        "contentType":"text\/plain; charset=US-ASCII",
        "boundary":"--2__=alternative",
        "data":"Red Text\r\nBlue Text\r\n\"
    },
    {
        "contentType":"text\/html; charset=US-ASCII",
        "contentDisposition":"inline",
        "boundary":"--2__=alternative",
        "data":"<html><body><font size=\"2\" color=\"#FF0000\" face=\"sans-
serif\">Red Text<\/font><br>\r\n<font size=\"2\" color=\"#0000FF\"
face=\"sans-serif\">Blue Text<\/font><br>\r\n<br>\r\n<img
src=\"cid:2__=
0ABBF3A9DFFE0C9A8f9e8a93df93869091@local\"width
=\"400\" height=\"319\"><br>\r\n<br>\r\n<\/body><\/html>"
    }, TABLE 2-continued

```
{
    "contentType":"image\/gif; name=\"Image.gif\"",
    "contentDisposition":"inline; filename=\"Image.gif\"",
    "contentID":"<2__=
ABBF3A9DFFE0C9A8f9e8a93df93869091@local>
",
    "contentTransferEncoding":"base64",
    "boundary":"--1__=related",
    "data":
"R0lGOD1hkAE\/AeQAAAAAAgICCAgIBgYGBAQECgoKDA
wMDg4OEBAQEhISFBQUFhYWP\/\/\/2BgYGho\r\
naHBwcPDw8Ojo6
Hh4eI...."
},
{
    "contentType":"image\/jpeg; name=\"Picture.JPG\"",
    "contentDisposition":"attachment; filename=\"Picture.JPG\"",
    "contentID":"<1__=
0ABBF3A9DFFE0C9A8f9e8a93df93869091@local>
",
    "contentTransferEncoding":"base64",
    "boundary":"--0__=mixed",
    "data":
"\/9j\/4AAQSkZJRgABAQEAYABgAAD\/2wBDAAgGBgcGBQg
HBwcJCQgKDBONDAsLDBkSEw8UHRofHh0a\r\
nHBwgJC4nICIsIxwc
KDcp...."
}
]
}
}
```

Table 3 presents another example of a JSON array 150 generated from the example rich text data 140. In this example, the rich text data 140 includes simple text.

TABLE 3

```
"content":    [
    {
        "contentType":"text\/html; charset=US-ASCII",
        "contentDisposition":"inline",
        "data":"<html><body><font size=
\"2\" face=\"sans-serif\">This is some
simple rich text<\/font><\/body><\/html>",
    }
]
```

Table 4 presents another example of a JSON array 150 generated from the example rich text data 140. In this example, the rich text data 140 includes text represented as plain text and HTML.

TABLE 4

```
"content":    [
    {
        "contentType":"multipart\/alternative;
Boundary=\"0__=
0ABBF0CADFF8FF618f9e8a93df938690918c0ABBF0
CADFF8FF61\"",
        "contentDisposition":"inline"
    },
    {
        "contentType":"text\/plain; charset=US-ASCII",
        "data":"This is some simple rich text",
        "boundary":"--
0__=
0ABBF0CADFF8FF618f9e8a93df938690918c0ABBF0CADFF8FF6
1"
    },
    {
        "contentType":"text\/html; charset=US-ASCII",
        "contentDisposition":"inline",
        "data":
```

TABLE 4-continued

```
"<html><body><font size=\"2\" face=\"sans-serif\">This is some
simple rich text<\/font><\/body><\/html>",
        "boundary":"--
0__=
0ABBF0CADFF8FF618f9e8a93df938690918c0ABBF0CADFF8FF6
1"
    }
]
```

Table 5 presents another example of a JSON array 150 generated from the example rich text data 140. In this example, the rich text data 140 includes an embedded image.

TABLE 5

```
"content":    [
    {
        "contentType":"multipart\/related;
Boundary=\"0__=
0ABBF0CADFF856DC8f9e8a93df938690918c0ABBF
0CADFF856DC\""
    },
    {
        "contentType":"multipart\/alternative;
Boundary=\"1__=
0ABBF0CADFF856DC8f9e8a93df938690918c0ABBF
0CADFF856DC\"",
        "boundary":"--
0__=
0ABBF0CADFF856DC8f9e8a93df938690918c0ABBF0CADFF856
DC"
    },
    {
        "contentType":"text\/plain; charset=US-ASCII",
        "data":"This is rich text\r\n",
        "boundary":"--
1__=
0ABBF0CADFF856DC8f9e8a93df938690918c0ABBF0CADFF856
DC"
    },
    {
        "contentType":"text\/html; charset=US-ASCII",
        "contentDisposition":"inline",
        "data":
"<html><body><font size=\"2\" face=\"sans-serif\">This is rich
text<\/font><br>\r\n<br>\r\n<img
src=\"cid:1__=0ABBF0CADFF856DC8f9e8a93df93869091@local\"
width=\"50\" height=\"50\"><\/body><\/html>\r\n",
        "boundary":"--
1__=
0ABBF0CADFF856DC8f9e8a93df938690918c0ABBF0CADFF856
DC"
    },
    {
        "contentType":"image\/gif; name=\"0B346820.gif\"",
        "contentID":
"<1__=0ABBF0CADFF856DC8f9e8a93df93869091@local>
",
        "contentDisposition":"inline; filename=\"0B346820.gif\"",
        "contentTransferEncoding":"base64",
        "data":
"R0lGODlhMgAyAOYAAPz7+f\/\/\/\/355P6ZSP9uAfvRWvymWf
+MNv3Wa9nFs\/342PuzaNO7pfjHaM2a...",
        "boundary":"--
0__=
0ABBF0CADFF856DC8f9e8a93df938690918c0ABBF0CADFF856
DC"
    }
]
```

Table 6 presents another example of a JSON array 150 generated from the example rich text data 140. In this example, the rich text data 140 includes an attachment.

TABLE 6

```
"content":    [
    {
       "contentType":"multipart\/mixed;
       Boundary=\"0__=
       0ABBF0CADFFFA1298f9e8a93df938690918c0ABBF0
       CADFFFA129\""
    },
    {
       "contentType":"multipart\/alternative;
       Boundary=\"1__=
       0ABBF0CADFFFA1298f9e8a93df938690918c0ABBF0
       CADFFFA129\"",
       "boundary":"--
       0__=
       0ABBF0CADFFFA1298f9e8a93df938690918c0ABBF0CADFFFA1
       29"
    },
    {
       "contentType":"text\/plain; charset=US-ASCII",
       "data":"This is rich text\r\n\r\n(See attached file: domino.gif)",
       "boundary":"--
       1__=
       0ABBF0CADFFFA1298f9e8a93df938690918c0ABBF0CADFFFA1
       29"
    },
    {
       "contentType":"text\/html; charset=US-ASCII",
       "contentDisposition":"inline",
       "data":
       "<html><body><font size=\"2\" face=\"sans-serif\">This is rich
       text<\/font><br>\r\n<div id=\"MIMEAttachInfoDiv\"
       style=\"display:none\" title=\"|domino.gif\"><\/div><br>\r\n<i>(See
       attached file: domino.gif)<\/i><\/body><\/html>\r\n",
       "boundary":"--
       1__=
       0ABBF0CADFFFA1298f9e8a93df938690918c0ABBF0CADFFFA1
       29"
    },
    {
       "contentType":"image\/gif; name=\"domino.gif\"",
       "contentID":
       "<1__=0ABBF0CADFFFA1298f9e8a93df93869091@local>
       ",
       "contentDisposition":"attachment; filename=\"domino.gif\"",
       "contentTransferEncoding":"base64",
       "data":
       "R0lGODlhMgAyAOYAAPz7+f\/\/\/\/355P6ZSP9uAfvRWvymWf
       +MNv3Wa9nFs\/342PuzaNO7pfjHaM2a...",
       "boundary":"--
       0__=
       0ABBF0CADFFFA1298f9e8a93df938690918c0ABBF0CADFFFA1
       29"
    }
]
```

Table 7 presents another example of a JSON array 150 generated from the example rich text data 140. In this example, the rich text data 140 includes an embedded image and an attachment.

TABLE 7

```
"content":    [
    {
       "contentType":"multipart\/mixed;
       Boundary=\"0__=
       0ABBF0CADFFFE56C8f9e8a93df938690918c0ABBF
       0CADFFFE56C\""
    },
    {
       "contentType":"multipart\/related;
       Boundary=\"1__=
       0ABBF0CADFFFE56C8f9e8a93df938690918c0ABBF
       0CADFFFE56C\"",
       "boundary":"--
       0__=
       0ABBF0CADFFFE56C8f9e8a93df938690918c0ABBF0CADFFFE5
       6C"
    },
```

TABLE 7-continued

```
    {
       "contentType":"multipart\/alternative;
       Boundary=\"2__=
       0ABBF0CADFFFE56C8f9e8a93df938690918c0ABBF
       0CADFFFE56C\"",
       "boundary":"--
       1__=
       0ABBF0CADFFFE56C8f9e8a93df938690918c0ABBF0CADFFFE5
       6C"
    },
    {
       "contentType":"text\/plain; charset=US-ASCII",
       "data":"This is rich text\r\n\r\n\r\n\r\n(See attached file: domino.gif)",
       "boundary":"--
       2__=
       0ABBF0CADFFFE56C8f9e8a93df938690918c0ABBF0CADFFFE5
       6C"
    },
    {
       "contentType":"text\/html; charset=US-ASCII",
       "contentDisposition":"inline",
       "data":
       "<html><body><font size=\"2\" face=\"sans-serif\">This is rich
       text<\/font><br>\r\n<br>\r\n<img
       src=\"cid:2__=0ABBF0CADFFFE56C8f9e8a93df93869091@local\"
       width=\"50\" height=\"50\"><br>\r\n<div id=
       \"MIMEAttachInfoDiv\"
       style=\"display:none\" title=\"|domino.gif\"><\/div><br>\r\n<i>(See
       attached file: domino.gif)<\/i><\/body><\/html>\r\n",
       "boundary":"--
       2__=
       0ABBF0CADFFFE56C8f9e8a93df938690918c0ABBF0CADFFFE5
       6C"
    },
    {
       "contentType":"image\/gif; name=\"0B036305.gif\"",
       "contentID":"<2__=
       0ABBF0CADFFFE56C8f9e8a93df93869091@local>
       ",
       "contentDisposition":"inline; filename=\"0B036305.gif\"",
       "contentTransferEncoding":"base64",
       "data":
       "R0lGODlhMgAyAOYAAPz7+\/\/\/\/355P6ZSP9uAfvRWvymWf
       +MNv3Wa9nFs\/342PuzaNO7pfjHaM2a...",
       "boundary":"--
       1__=
       0ABBF0CADFFFE56C8f9e8a93df938690918c0ABBF0CADFFFE5
       6C"
    },
    {
       "contentType":"image\/gif; name=\"domino.gif\"",
       "contentID":
       "<1__=0ABBF0CADFFFE56C8f9e8a93df93869091@local>
       ",
       "contentDisposition":"attachment; filename=\"domino.gif\"",
       "contentTransferEncoding":"base64",
       "data":
       "R0lGODlhMgAyAOYAAPz7+f\/\/\/\/355P6ZSP9uAfvRWvymWf
       +MNv3Wa9nFs\/342PuzaNO7pfjHaM2a...",
       "boundary":"--
       0__=
       0ABBF0CADFFFE56C8f9e8a93df938690918c0ABBF0CADFFFE5
       6C"
    }
]
```

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of formatting rich text data into a JavaScript Object Notation (JSON) array, the method comprising:
   creating a parent JSON object within the JSON array;
   identifying header information defined as a field of the rich text data and representing the header information in a root property of the parent JSON object;
   identifying a plurality of parts of the rich text data and, for each of the plurality of parts of the rich text data:
      via a processor, identifying content of the part, inserting into the parent JSON object a first respective child JSON object, and representing the content of the part in a content property of the respective child JSON object; and
      identifying header information of the part and representing the header information in a header property of the respective first child JSON object;
   wherein the children JSON objects are organized into a JSON array within the parent JSON object; and
   outputting the JSON array in a JSON file.

2. The method of claim 1, further comprising:
   accessing the rich text data from a Multipurpose Internet Mail Extensions (MIME) multipart message;
   wherein:
      identifying the header information defined as the field of the rich text data comprises identifying the header information in the MIME multipart message; and
      identifying the plurality of parts of the rich text data comprises identifying the plurality of parts of the rich text data in the MIME multipart message.

3. The method of claim 1, further comprising:
   for each of the plurality of parts of the rich text data, identifying a boundary of the part and representing the boundary in a boundary property of the respective first child JSON object.

4. The method of claim 1, further comprising:
   identifying that the rich text data contains only multipart/mixed or multipart/related data types; and
   assigning to the respective first children JSON objects a contentDisposition property having at least one attribute that indicates relationships among respective parts of the rich text data.

5. The method of claim 1, further comprising:
   assigning to a respective one of first children JSON objects a contentType property having a multipart/alternative attribute;
   converting alphanumeric text in the rich text data to plain text; and
   inserting into the respective one of the first children JSON objects a second child JSON object into which the plain text is placed, and assigning to the second child JSON object a contentType property having a text/plain attribute.

6. The method of claim 5, further comprising:
   converting alphanumeric text in the rich text data to Hypertext Markup Language (HTML) formatted text; and
   inserting into the respective one of the first children JSON objects a third JSON object into which the HTML formatted text is placed, and assigning to the third child JSON object a contentType property having a text/html attribute.

7. The method of claim 1, further comprising:
identifying at least one attachment to the rich text data;
inserting into the parent JSON object a second child JSON object, and assigning to the second child JSON object a contentType property having a multipart/mixed attribute;
for each of the at least one attachment, inserting into the second child JSON object a third child JSON object identifying the respective attachment, and assigning to the third child JSON object a conentDisposition property having an attach attribute.

8. The method of claim 1, further comprising:
identifying at least one embedded image in the rich text data;
inserting into the parent JSON object a second child JSON object, and assigning to the second child JSON object a contentType property having a multipart/related attribute;
for each of the at least one embedded image, inserting into the second child JSON object a third child JSON object identifying the respective embedded image, and assigning to the third child JSON object a conentDisposition property having an inline attribute.

9. A system comprising:
a processor and memory configured to initiate executable operations comprising:
creating a parent JavaScript Object Notation (JSON) object within a JSON array;
identifying header information defined as a field of the rich text data and representing the header information in a root property of the parent JSON object;
identifying a plurality of parts of the rich text data and, for each of the plurality of parts of the rich text data:
identifying content of the part, inserting into the parent JSON object a first respective child JSON object, and representing the content of the part in a content property of the respective child JSON object; and
identifying header information of the part and representing the header information in a header property of the respective first child JSON object;
wherein the children JSON objects are organized into a JSON array within the parent JSON object; and
outputting the JSON array in a JSON file.

10. The system of claim 9, the processor and memory further configured to initiate executable operations comprising:
accessing the rich text data from a Multipurpose Internet Mail Extensions (MIME) multipart message;
wherein:
identifying the header information defined as the field of the rich text data comprises identifying the header information in the MIME multipart message; and
identifying the plurality of parts of the rich text data comprises identifying the plurality of parts of the rich text data in the MIME multipart message.

11. The system of claim 9, the processor and memory further configured to initiate executable operations comprising:
for each of the plurality of parts of the rich text data, identifying a boundary of the part and representing the boundary in a boundary property of the respective first child JSON object.

12. The system of claim 9, the processor and memory further configured to initiate executable operations comprising:
identifying that the rich text data contains only multipart/mixed or multipart/related data types; and
assigning to the respective first children JSON objects a contentDisposition property having at least one attribute that indicates relationships among respective parts of the rich text data.

13. The system of claim 9, the processor and memory further configured to initiate executable operations comprising:
assigning to a respective one of first children JSON objects a contentType property having a multipart/alternative attribute;
converting alphanumeric text in the rich text data to plain text; and
inserting into the respective one of the first children JSON objects a second child JSON object into which the plain text is placed, and assigning to the second child JSON object a contentType property having a text/plain attribute.

14. The system of claim 13, the processor and memory further configured to initiate executable operations comprising:
converting alphanumeric text in the rich text data to Hypertext Markup Language (HTML) formatted text; and
inserting into the respective one of the first children JSON objects a third JSON object into which the HTML formatted text is placed, and assigning to the third child JSON object a contentType property having a text/html attribute.

15. The system of claim 9, the processor and memory further configured to initiate executable operations comprising:
identifying at least one attachment to the rich text data;
inserting into the parent JSON object a second child JSON object, and assigning to the second child JSON object a contentType property having a multipart/mixed attribute;
for each of the at least one attachment, inserting into the second child JSON object a third child JSON object identifying the respective attachment, and assigning to the third child JSON object a conentDisposition property having an attach attribute.

16. The system of claim 9, the processor and memory further configured to initiate executable operations comprising:
identifying at least one embedded image in the rich text data;
inserting into the parent JSON object a second child JSON object, and assigning to the second child JSON object a contentType property having a multipart/related attribute;
for each of the at least one embedded image, inserting into the second child JSON object a third child JSON object identifying the respective embedded image, and assigning to the third child JSON object a conentDisposition property having an inline attribute.

17. A computer program product for formatting rich text data into a JavaScript Object Notation (JSON) array, the computer program product comprising:
a computer-readable storage device having stored thereon program code that, when executed, configures a processor to perform executable operations comprising:

creating a parent JSON object within the JSON array;

identifying header information defined as a field of the rich text data and representing the header information in a root property of the parent JSON object;

identifying a plurality of parts of the rich text data and, for each of the plurality of parts of the rich text data:

identifying content of the part, inserting into the parent JSON object a first respective child JSON object, and representing the content of the part in a content property of the respective child JSON object; and     identifying header information of the part and representing the header information in a header property of the respective first child JSON object;

wherein the children JSON objects are organized into a JSON array within the parent JSON object; and outputting the JSON array in a JSON file.

18. The computer program product of claim 17, the executable operations further comprising:

accessing the rich text data from a Multipurpose Internet Mail Extensions (MIME) multipart message;

wherein:

identifying the header information defined as the field of the rich text data comprises identifying the header information in the MIME multipart message; and     identifying the plurality of parts of the rich text data comprises identifying the plurality of parts of the rich text data in the MIME multipart message.

19. The computer program product of claim 17, the executable operations further comprising:

for each of the plurality of parts of the rich text data, identifying a boundary of the part and representing the boundary in a boundary property of the respective first child JSON object.

20. The computer program product of claim 17, the executable operations further comprising:

identifying that the rich text data contains only multipart/mixed or multipart/related data types; and assigning to the respective first children JSON objects a contentDisposition property having at least one attribute that indicates relationships among respective parts of the rich text data.

\* \* \* \* \*